United States Patent

[11] 3,545,422

[72] Inventor John V. McNulty
 Norwich, New York
[21] Appl. No. 760,241
[22] Filed Sept. 17, 1968
[45] Patented Dec. 8, 1970
[73] Assignee George P. Kingsley
 Holland Patent, New York

[54] CHAIN SAW APPARATUS FOR SAWING REINFORCED CONCRETE
 13 Claims, 7 Drawing Figs.
[52] U.S. Cl. .................................................. 125/21,
 125/22; 143/32
[51] Int. Cl. ........................................... B28d 1/08,
 B28d 1/12; B27b 17/00
[50] Field of Search .......................................... 143/32;
 125/21, 22

[56] References Cited
 UNITED STATES PATENTS
| | | | |
|---|---|---|---|
| RE24,129 | 3/1956 | Hassler | 143/32X |
| 3,078,886 | 2/1963 | Childress | 143/32X |
| 3,311,415 | 3/1967 | Miller | 125/21X |
| 2,869,534 | 1/1959 | Stihl | 125/21 |

FOREIGN PATENTS
| | | | |
|---|---|---|---|
| 21,416 | 6/1961 | Germany | 143/32 |
| 815,631 | 7/1959 | Great Britain | 125/21 |

Primary Examiner—Harold D. Whitehead
Attorney—Wenderoth, Lind & Ponack

ABSTRACT: An apparatus for sawing very hard materials, such as reinforced concrete, stone and the like. A chain saw having saw oscillating means is mounted on a saw supporting framework adapted to be mounted on the surface of a body to be cut. The framework has guide rods and a platform movable along said guide rods and on which said motor means is mounted. The framework supports said guide rods in one of two position, one position being parallel to the surface of said body and the other position being perpendicular to the surface of said body. Platform feed means is provided for driving said platform along said guide rods at a controlled rate of feed. The chain has teeth which are generally oval shape and having a central body portion and opposite end portions, the central body portion having a peaked top surface and being a matrix having particles of hard cutting material embedded therein and projecting therefrom, the opposite end portions having a partially conical top surface joining the peaked top surface of the central body portion in lines and being a matrix having a highly abrasive finely divided material therein.

PATENTED DEC 8 1970

INVENTOR
JOHN V. McNULTY

BY Wenderoth, Lind & Ponack
ATTORNEYS

PATENTED DEC 8 1970

3,545,422

INVENTOR
JOHN V. McNULTY

BY Wenderoth, Lind & Ponack
ATTORNEY

CHAIN SAW APPARATUS FOR SAWING REINFORCED CONCRETE

The present invention relates to a chain saw for sawing very hard materials, such as reinforced concrete or stone, or the like, and more particularly it relates to such a chain saw which has an improved form of tooth on the chain, and which can be mounted on the material to be sawed for automatic sawing operation.

In my earlier application Ser. Nos. 568,854 filed July 29, 1966, now abandoned and 572,138, filed Aug. 12, 1966, now Pat. No. 3,459,169, issued Aug. 5, 1969, there has been described a chain saw for sawing very hard materials, which saw has a bar with a groove therearound and a chain running in the groove and driven by a motor through a sprocket wheel, the chain being made up of tooth members joined by links, much in the manner of a conventional chain saw for sawing wood and the like. The teeth were described as having very hard particles, such as diamonds projecting therefrom. Means were provided for directing a stream of water along the chain as it ran in the groove in the bar. The saw was described in said applications as being capable of being held in the hands of the operator during its operation.

In the second said application, there was described a modified saw for making plunge cuts, i.e. cuts through a wall from one side to the other, this saw having circular saw blades on the nose thereof to be placed against the wall to assist in driving the saw through the wall in a direction parallel to the length of the bar.

Experience has shown, however, that it would be desirable to have a saw of this general type which need not be specially modified in order to make such plunge cuts, i.e. which would not have the circular saw blades on the nose, yet which could still make plunge cuts when required. Moreover, because the saws are quite weighty, being heavily constructed in order to withstand the stresses imposed on them in their normal use, and because the saws cut relatively slowly as compared to a similar saw for cutting wood, an operator quickly tires if he has to hold the saw for a cut long enough for a door or window opening, for example.

In addition, it has been found that the teeth on the chain, while they are more durable than those in conventional saws of this type in that they can make a much longer cut than a conventional saw in the same length of time, nevertheless would be much more satisfactory if they had a longer life.

It is an object of the present invention to provide an improved tooth member for mounting on the chain of a saw for cutting hard material which enables plunge cutting without the necessity for the additional circular blades on either side of the nose of the bar.

A further object of the invention is the provision of means for mounting the saw on a wall or like body to be cut so that it can be firmly guided and fed in a controlled manner in the plunge cutting direction.

It is a still further object of the invention to provide such mounting means which can be converted into mounting means for holding the saw while it automatically makes a vertical horizontal, or angular cut along a wall or like body.

Another object of the invention is the provision of mounting means which includes means for moving the saw along the wall or like to be cut in a horizontal direction under a constant load for automatically cutting in a horizontal direction.

Still another object of the invention is the provision of means for rocking the saw in the plane of the cut for improving the cutting action of the saw and minimizing wear on the teeth of the chain.

The objects of the invention are achieved by the provision of a saw in which the tooth members which are linked together to form the chain have a central body portion having hard particles, such as diamonds or the like, projecting from a matrix, and having end portions on opposite ends of the tooth members having no such particles projecting therefrom, but rather being a matrix having a highly abrasive material, such as diamond dust, embedded therein.

The means for mounting the saw on a structure or body to be sawed has a mounting rod which is attachable directly to the wall or body, and which carries a pair of guide rods along which a motor mounting platform carrying the saw motor is slidable. The guide rods are mounted so that they can be positioned either parallel to or perpendicular to the face of the body or wall to be sawed so that the motor supporting platform and the saw carried thereby can move either parallel to the wall for normal cutting or perpendicular thereto for plunge cutting. Means are also provided for feeding the platform along the guide rods in a controlled manner during plunge cutting. The connection between the motor and the sprocket for driving the chain includes means for oscillating the bar of the saw about the motor so that the chain and bar rock back and forth in the plane of the cut.

The invention will now be described in greater detail in connection with the accompanying drawings, in which.

Figure 6:
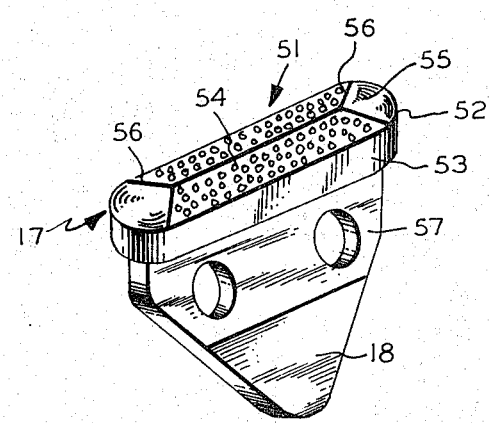
Figure 7:
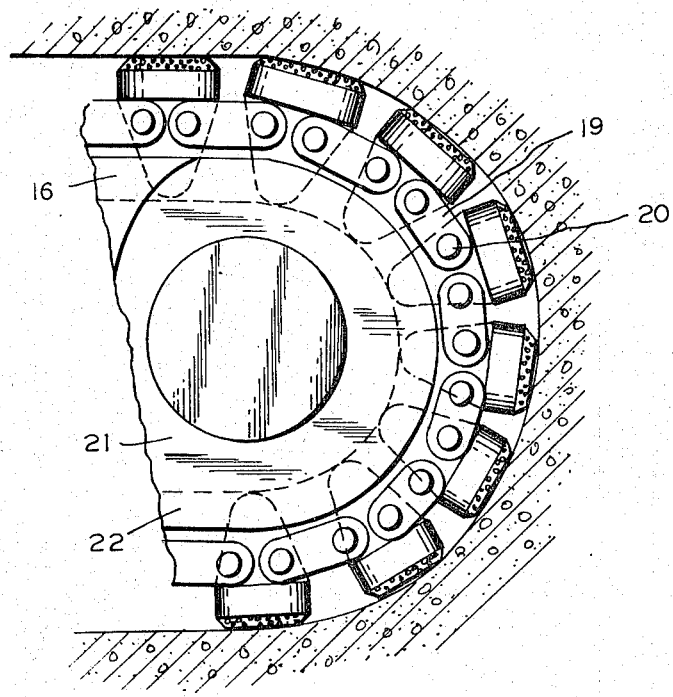

FIG. 6 is a perspective view, on an enlarged scale, of a tooth member of the chain of the saw; and FIG. 7 is an elevation view, on an enlarged scale, of the nose portion of the saw within a reinforced concrete body during a plunge cut The chain saw of the present invention comprises a conventional motor housing 10 in which is contained the driving motor for driving the chain. The particular saw shown has an electrically driven motor, but it will of course be understood that the drive could be any other kind, such as a gasoline motor or a compressed air motor. Attached to the motor housing 10 is a reduction gear and oscillating gear housing 11 retaining reduction gears for reducing the speed of the motor, and for oscillating the bar of the saw relative to the motor, as will be explained hereinafter. Attached to the gear housing 11 is a bar mounting member 12 on which is secured the bar 14 of the saw. Projecting laterally through the bar mounting member 12 is a shaft from the reduction gearing within housing 11, which carries sprocket wheel 13. The sprocket wheel 13 has the teeth thereon engaged with a chain 15 which runs in a groove 16 in the bar 14, which groove is shown most clearly in FIG. 7. The chain is made up of tooth members 17, FIG. 6, joined to each other by links 19 which are connected to the tooth members by pins or rivets 20. The tooth members each have a downwardly extending projection 18 thereon which extends into the groove 16 for guiding the chain 15 along the groove. At the free or nose end of the bar 14 is a rotatable nosewheel 21 which also has a groove 22 therein which is the same depth as the groove 16, and which forms a continuation of the groove 16. The nosewheel 21 rotates as the chain moves around the nose end of the bar, thus guiding the chain and permitting it to move freely around the nose of the bar.

The sprocket wheel 13 has the teeth thereon engaged between the projections 18 on the tooth members for driving the chain in a conventional manner.

The motor housing 10 is mounted on a platform 23 which has guide members 24 depending therefrom. The platform is slidably mounted on a saw supporting framework which is comprised of guide rods 30, here shown as two parallel rods, having the ends thereof mounted in end supporting members 31. The end supporting members 31 have clamping members 32a adapted to be secured to a center body portion 31a. A crosspiece 31b extends through body portion 31a and has the ends of the guide rods 30 extending slidably therethrough, the rods 30 being fixable in the crosspiece 31b by setscrews or the like. The end supporting members 31 are in turn slidable on a mounting rod 32 with the clamping members extending behind rod 32 and adapted to clamp members 31 to rod 32 by tightening screws or the like (not shown). Rod 32 has structure mounting supports 33 adjustably mounted thereon by setscrews (not shown) and which are adapted to be attached to a reinforced concrete structure, such as a wall W, by bolts or the like.

Figure 2:
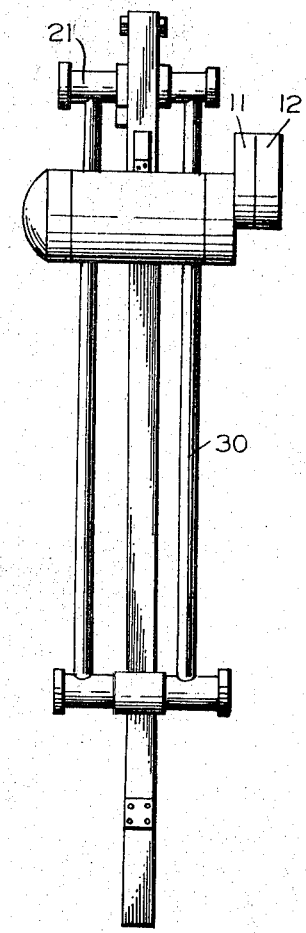
FIG. 2 is a front elevation view of the saw of FIG. 1.
Figure 1:
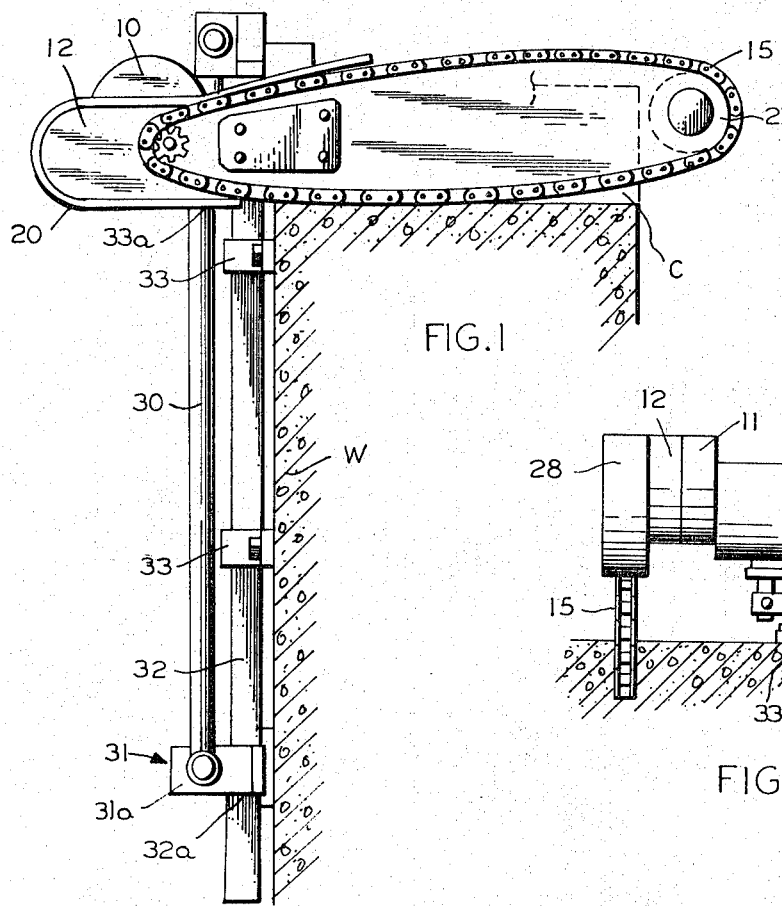
FIG. 1 is a side elevation view of the saw according to the present invention mounted for a vertical cut through a wall of reinforced concrete.
Figure 3:
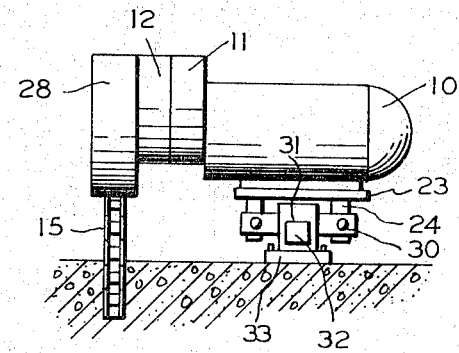
FIG. 3 is a top plan view of the saw of FIG. 1.

As shown in FIGS. 1—3, the saw can be mounted on a wall W or like structure by attaching the structure mounting supports 33 at spaced intervals along the wall on a line parallel to the line along which a cut is to be made. The mounting rod 32 is adjustably positioned in the supports 33, and is fixed in position by the setscrews or the like. End supporting members 31, which are slidable along the rod 32 are then fixed in place on the rod 32 by tightening the securing means, such as screws, for the clamping members 32a, thereby securing the end support members 31 in position on the rod 32. The motor mounting platform 23 is then moved along the guide rods 30 until the chain of the saw is against the wall 0 where the cutting is to commence, and the platform is left in this position so as to be freely slidable on the guide rods 30.

The drive motor within the housing 10 is then driven, driving the sprocket wheel 13 so as to drive the chain 15. Preferably, when cutting a wall where the material which is removed from the cut can be conveniently discharged on the opposite side of the wall from the saw, the saw is driven counterclockwise as viewed in FIG. 1. A shield 28 is provided around the portion of the chain extending around the sprocket wheel 13, because material will be carried along the saw blade and thrown off as the chain moves around the sprocket wheel. In order to produce the greatest efficiency, a tube 33a is mounted on the bar mounting member 12 and directed along the path of the saw blade moving toward the cut in the wall, and this tube is supplied with a liquid, such as water, which is directed along the run of the chain as it enters the cut and at substantially the same speed the chain is moving for lubricating the movement of the chain along the bar, and cleaning and cooling, the kerf being cut by the chain in the manner disclosed in my said application Ser. No. 568,854.

The saw is run, and the movement the tooth members along the bottom of the bar 14 removes material from the wall W to form a cut C therein. Since the bar mounting member 12 and the platform 23 are freely slidable on the guide rods 30, the saw is free to move downwardly under the effect of gravity, and as the chain removes material from the cut C the saw will in fact slide vertically downwardly along the guide rods 30. The oscillating gear within the gear housing 11 will oscillate the bar mounting member 12 about the housing 11, and will rock the bar 14 and chain 15 of the saw from the position shown in FIG. 1 to a second position in which the other end of the lower run of the chain is in contact with the bottom of the kerf C and the end of the lower run of the chain nearer the sprocket wheel 13 is raised from the bottom of the kerf. The bottom of the kerf serves as the pivot point, so that the platform 23 with the motor and bar mounting members thereon will be raised slightly against the resistance of the bottom of the kerf. The oscillating gear is set to rock the saw about 3 times per minute. The rocking movement has been found to increase the life of the chain as it has a tendency to keep the pressure on the chain tooth more uniform.

Thus, once the saw is positioned and set running, and the water from the tube 33a is flowing the saw will cut automatically until it reaches the bottom of the guide rods 30. The saw supporting framework can then be repositioned to continue the same cut or to make a new cut.

Figure 4:
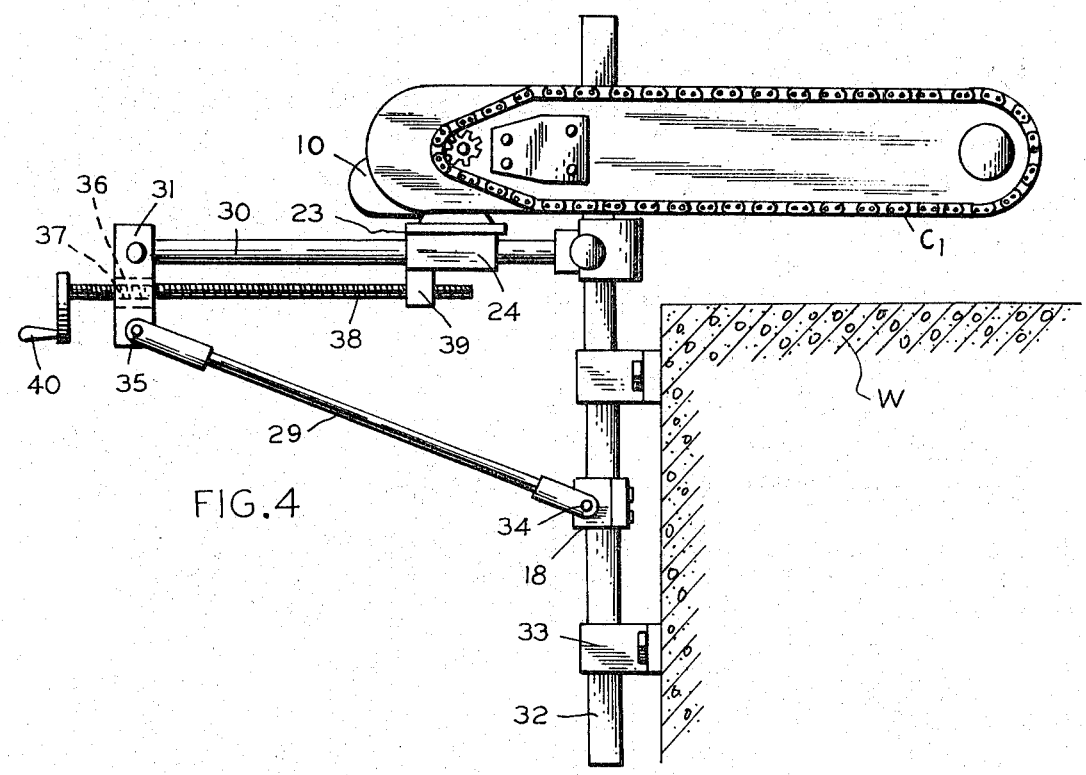
FIG. 4 is a side elevation view of the saw of FIG. 1 with the supporting means arranged for making a plunge cut.

If it is desired to make a plunge cut, the saw is positioned as shown in FIG. 4. The lower end supporting member 31 is removed from the mounting rod 32 by removing the clamping member 32a, and the lower end of the guide rods 30 carried by the end supporting member 31 are raised until the guide rods 30 are horizontal. The upper end supporting member 31 is then loosened so it can slide on the mounting rod 32 and along with the platform 23 is moved to the extreme outer ends of the guide rods 30 so that the nose of the saw is spaced from the surface of the wall W. The guide rods 30 are raised or lowered to a position such that the nose of the saw is in the desired position for making the plunge cut. The upper end supporting member is then tightened on the mounting rod 32, and an extension rod support 41 is mounted on the mounting rod 32 and an extension rod 29 is connected between the extension rod support 41 and the lower end supporting member 31, being connected to these members by bolts 34 and 35. The guide rods 30 are thus braced in a horizontal position.

With the parts in these positions, a feed screw 38 is threaded through an insert 36 having a threaded bore 37 therethrough, the insert being placed in the space within the lower end supporting member 31 left vacant by the mounting rod 32, and is also threaded through a feed nut 39 which is attached to the bottom of the guide members 24 on the platform 23. Rotation of the feed screw 38 by the handle 49 will thus feed the guide members 24 and platform 23 carrying the saw in a horizontal direction. The motor within housing 10 is run, and the feed screw 38 rotated, and the saw is moved horizontally to make the plunge cut $C_1$ in the wall W. By carefully controlling the rate of feed the cutting conditions and thus the load on the tooth members 17 and the chain 15 can be limited to increase the tooth life and the chain life.

Figure 5:
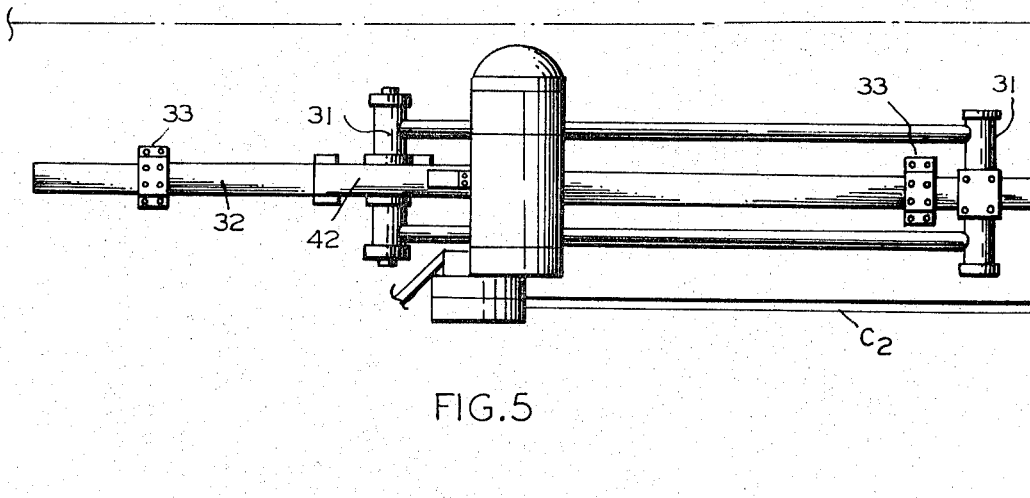
FIG. 5 is a front elevation view of the saw mounted for making a horizontal cut.

As shown in FIG. 5, the saw can be mounted for automatically making a horizontal cut. The mounting supports 33 are attached to the wall or another body to be cut on a horizontal line offset slightly from the line along which the cut is to be made, and the mounting rod 32 positioned therein, and the end support members 31 are mounted on the mounting rod 32 at points along the line of the cut to be made. The platform 23 is positioned at the point where the saw blade will start the cut, and the chain placed against the surface where the cut is to start. A flat spring 42 which is coiled up on a rotatable shaft so that it can be extended and retracted by winding and unwinding is mounted on the mounting rod 32 at a point spaced from the position of the platform in the direction in which the cut is to be made, and the spring 42 is unwound and extended and attached to the platform 23 by bolts or the like. The spring 42 thus exerts a tension force on the platform urging the motor along the guide rods 30 toward the position of the mounting of the spring. In FIG. 5, the tension is in a direction to the left in the FIG. The motor is then run to drive the chain, and the water or other liquid supplied through the tube 33a, and the saw will automatically make a horizontal cut $C_2$ starting from the right in FIG. 5 and moving to the left. The saw will be rocked in the same manner as in the embodiment of FIGS. 1-3.

The specific form of the tooth 17 is shown clearly in FIG. 6. The tooth has a central body portion 51 and opposite end portions 52. The tooth when viewed from above is generally oval shaped having a circumferential surface 53 with substantially flat side portions running along the central body portion and cylindrically curved end surfaces extending around the end portions 52. The top surface 54 of the central body portion is peaked, while the surface of the end portions is generally that of the segment of a cone, joining the peaked top surface of the central body portion along lines 56.

The tooth members 17 are formed by molding portions of a matrix material in a single tooth mold. The matrix material of the center section has chips of a hard cutting material, such as diamonds, embedded therein, and arranged to project from the top surface 54 of the central body portion 51 as the tooth wears. The end portions 52 are of the same matrix material but with a highly abrasive finely divided material, such as diamond dust, throughout, so that the top surfaces 55 of the end portions present a highly abrasive surface even during wear thereof. The tooth is infiltrated with a binding material that also attaches the vertical flange portion 57, from which the projection 18 extends downwardly.

During normal cutting of a straight cut, such as is shown in FIGS. 1—3 and 5, the central body portion 51 of the tooth will perform substantially all of the cutting action, being the only portion of the tooth in engagement with the surface of the cut. However, during a plunge cut, the teeth are driven around the nosewheel 21, and the point at the junction between the top of the peaked top surface 54 of the central portion and the peak of the conical surface 55 of the end portion will bear against the curved surface of the cut. It has been found from practical experience that omitting the projecting diamonds from the end portions 52 causes the engagement of the end portions with the curved surface of the kerf to rock the teeth in such a fashion that the peaked top surface 54 of the center portion 51 at the ends of the center portion is presented to the kerf and performs the cutting action.

The particular shape and composition of the tooth 17 is thus such that it can be used both for plunge cutting and straight cutting, and experience has shown that this form of tooth has a remarkably long life when used for either of these two types of cuts. The particular form of tooth is thus a dual purpose form of tooth. When used together with the saw supporting framework and feed screw it makes the saw adaptable for plunge cutting. When used together with the saw supporting framework and the oscillating means, it makes the saw adaptable for automatic straight line cutting with long chain life.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. An apparatus for sawing very hard materials, such as reinforced concrete, stone and the like, comprising a chain saw having a grooved blade with a grooved nosewheel on the free end thereof, a chain running in said blade and around the nosewheel, motor means on said saw coupled to said chain for driving said chain, saw oscillating means coupled between said saw and said motor means for oscillating said saw relative to said motor means in the plane of said blade, said chain having a plurality of teeth thereon and links coupling said teeth together, each tooth being generally oval shape and having a central body portion and opposite end portions, the central body portion having a peaked top surface and being a matrix having particles of hard cutting material embedded therein and projecting therefrom, the opposite end portions having a partially conical top surface joining the peaked top surface of the central body portion in lines and being a matrix having highly abrasive finely divided material therein, and a saw supporting framework adapted to be mounted on the surface of a body to be cut and having guide rods and a platform movable along said guide rods and on which said motor means is mounted, said framework supporting said guide rods in one of two positions, one position being parallel to the surface of said body and the other position being perpendicular to the surface of said body, and platform feed means for driving said platform along said guide rods at a controlled rate of feed.

2. An apparatus as claimed in claim 1 in which said saw supporting framework comprises a mounting rod, structure mounting supports adapted to be attached to the surface of the body to be cut and on which said rod is mounted, at least two end supporting members slidable on said mounting rod and fixable in position on said mounting rod, said guide rods being parallel rods slidably mounted in and fixable on said end supporting members and extending substantially parallel to said mounting rod, said guide rods being pivotably mounted on at least one of said end supporting members for pivoting movement away from the body to be cut to a position perpendicular to the surface of the body, and bracing means attachable to said guide rods and said mounting rod for holding the guide rods in the perpendicular position.

3. An apparatus as claimed in claim 2 in which said end supporting members comprise a center body portion, a clamping member attached to said center body portion and extending around the mounting rod, and a crosspiece rotatably mounted on said center member in which said guide rods are slidable and fixable.

4. An apparatus as claimed in claim 1 in which said platform feed means comprises a feed screw coupled to said platform and said framework and rotatable for feeding said platform along said guide rods.

5. An apparatus as claimed in claim 1 in which said platform feed means comprises a coiled flat spring having the outer free end connected to said platform and the inner end mounted on said framework.

6. An apparatus for sawing very hard materials, such as reinforced concrete, stone and the like, comprising a chain saw having a grooved blade with a grooved nosewheel on the free end thereof, a chain running in said blade and around the nosewheel, motor means on said saw coupled to said chain for driving said chain, saw oscillating means coupled between said saw and said motor means for oscillating said saw relative to said motor means in the plane of said blade, said chain having a plurality of teeth thereon and links coupling said teeth together, each tooth being generally oval shape and having a central body portion and opposite end portions, the central body portion having a peaked top surface and being a matrix having particles of hard cutting material embedded therein and projecting therefrom, the opposite end portions having a partially conical top surface joining the peaked top surface of the central body portion in lines and being a matrix having highly abrasive finely divided material therein, and a saw supporting framework adapted to be mounted on the surface of a body to be cut and having guide rods and a platform movable along said guide rods and on which said motor means is mounted, said framework supporting said guide rods in position parallel to the surface of said body.

7. An apparatus for sawing very hard materials, such as reinforced concrete, stone and the like, comprising a chain saw having a grooved blade with a grooved nosewheel on the free end thereof, a chain running in said blade and around the nosewheel, motor means on said saw coupled to said chain for driving said chain, saw oscillating means coupled between said saw and said motor means for oscillating said saw relative to said motor means in the plane of said blade, said chain having a plurality of teeth thereon and links coupling said teeth together, and a saw supporting framework adapted to be mounted on the surface of a body to be cut and having guide rods and a platform movable along said guide rods and on which said motor means is mounted, said framework supporting said guide rods in one of two positions, one position being parallel to the surface of said body and the other position being perpendicular to the surface of said body, and platform feed means for driving said platform along said guide rods at a controlled rate of feed.

8. An apparatus for sawing very hard materials, such as reinforced concrete, stone and the like, comprising a chain saw having a grooved blade with a grooved nosewheel on the free end thereof, a chain running in said blade and around the nosewheel, motor means on said saw coupled to said chain for driving said chain, said chain having a plurality of teeth thereon and links coupling said teeth together, each tooth being generally oval shape and having a central body portion and opposite end portions, the central body portion having a peaked top surface and being a matrix having particles of hard cutting material embedded therein and projecting therefrom, the opposite end portions having a partially conical top surface joining the peaked top surface of the central body portion in lines and being a matrix having highly abrasive finely divided material therein, and a saw supporting framework adapted to be mounted on the surface of a body to be cut and having guide rods and a platform movable along said guide rods and on which said motor means is mounted, said framework supporting said guide rods in one of two positions, one position being parallel to the surface of said body and the other position being perpendicular to the surface of said body, and platform feed means for driving said platform along said guide rods at a controlled rate of feed.

9. An apparatus for sawing very hard materials, such as reinforced concrete, stone and the like, comprising a chain saw having a grooved blade with a grooved nosewheel on the free end thereof, a chain running in said blade and around the nosewheel, motor means on said saw coupled to said chain for driving said chain, saw oscillating means coupled between said saw and said motor means for oscillating said saw relative to said motor means in the plane of said blade, said chain having a plurality of teeth thereon and links coupling said teeth together, each tooth being generally oval shape and having a central body portion and opposite end portions, the central body portion having a peaked top surface and being a matrix having particles of hard cutting material embedded therein and projecting therefrom, the opposite end portions having a partially conical top surface joining the peaked top surface of the central body portion in lines and being a matrix having highly abrasive finely divided material therein, and a saw supporting framework adapted to be mounted on the surface of a body to be cut and having guide rods and a platform movable along said guide rods and on which said motor means is mounted, said framework supporting said guide rods in a position parallel to the surface of said body, and platform feed means for driving said platform along said guide rods at a controlled rate of feed.

10. An apparatus for making plunge cuts in very hard materials, such as reinforced concrete, stone and the like, comprising a chain saw having a grooved blade with a grooved nosewheel on the free end thereof, a chain running in said blade and around the nosewheel, motor means on said saw coupled to said chain for driving said chain, said chain having a plurality of teeth thereon and links coupling said teeth together, each tooth being generally oval shape and having a central body portion and opposite end portions, the central body portion having a peaked top surface and being a matrix having particles of hard cutting material embedded therein and projecting therefrom, the opposite end portions having a partially conical top surface joining the peaked top surface of the central body portion in lines and being a matrix having highly abrasive finely divided material therein, and a saw supporting framework adapted to be mounted on the surface of a body to be cut and having guide rods and a platform movable along said guide rods and on which said motor means is mounted, said framework supporting said guide rods in a position perpendicular to the surface of said body, and platform feed means for driving said platform along said guide rods at a controlled rate of feed.

11. An apparatus for sawing very hard materials, such as reinforced concrete, stone and the like, comprising a chain saw having a grooved blade with a grooved nosewheel on the free end thereof, a chain running in said blade and around the nosewheel, motor means on said saw coupled to said chain for driving said chain, saw oscillating means coupled between said saw and said motor means for oscillating said saw relative to said motor means in the plane of said blade, said chain having a plurality of teeth thereon and links coupling said teeth together, and a saw supporting framework adapted to be mounted on the surface of a body to be cut and having guide rods and platform movable along said guide rods and on which said motor means is mounted, said framework supporting said guide rods in a position parallel to the surface of said body.

12. A tooth member for a chain for a chain saw for sawing very hard materials, said tooth member being generally oval in shape and having a central body portion and opposite end portions, the central body portion having a peaked top surface and being a matrix having particles of hard cutting material embedded therein and projecting therefrom, the opposite end portions having a partially conical top surface joining the peaked top surface of the central body portion in lines and being a matrix having highly abrasive finely divided material therein.

13. A saw supporting framework for supporting a chain saw for sawing very hard materials, said framework comprising guide rods, a platform adapted to carry the chain saw and slidable along said guide rods, at least two end supporting members on which said guide rods are slidably mounted and said guide rods being fixable in position in said end supporting members, a mounting rod on which said end supporting members are adjustably mounted, and structure mounting supports on which said mounting rod is supported and adapted to be mounted on the surface of the body to be cut, the mounting of said guide rods on at least one of said end supporting members being a pivotable mounting, the guide rods being pivotable away from said mounting rod to a position substantially perpendicular thereto, and bracing means attachable to said guide rods and said mounting rod for holding the guide rods in the perpendicular position.